July 23, 1963     A. A. ONDREJKA     3,098,643
SHOCK AND VIBRATION ISOLATOR Filed March 15, 1962     8 Sheets-Sheet 1

INVENTOR.
ALBERT A. ONDREJKA

BY Wade Koontz
Sherman H. Goldman
ATTORNEYS

July 23, 1963  A. A. ONDREJKA  3,098,643
SHOCK AND VIBRATION ISOLATOR
Filed March 15, 1962  8 Sheets-Sheet 2

INVENTOR.
ALBERT A. ONDREJKA
BY
Wade Loonty
Sherman H. Goldman
ATTORNEYS

July 23, 1963  A. A. ONDREJKA  3,098,643
SHOCK AND VIBRATION ISOLATOR
Filed March 15, 1962  8 Sheets-Sheet 3

INVENTOR.
ALBERT A. ONDREJKA
BY
ATTORNEYS

July 23, 1963

A. A. ONDREJKA

3,098,643

SHOCK AND VIBRATION ISOLATOR

Filed March 15, 1962

INVENTOR.
ALBERT A. ONDREJKA
BY
*Wade Looney and Sherman H. Goldman*
ATTORNEYS

July 23, 1963 A. A. ONDREJKA 3,098,643
SHOCK AND VIBRATION ISOLATOR
Filed March 15, 1962 8 Sheets-Sheet 5

INVENTOR.
ALBERT A. ONDREJKA
BY
_ATTORNEYS

July 23, 1963  A. A. ONDREJKA  3,098,643
SHOCK AND VIBRATION ISOLATOR
Filed March 15, 1962  8 Sheets-Sheet 7

INVENTOR.
ALBERT A. ONDREJKA
BY
ATTORNEYS

INVENTOR.
ALBERT A. ONDREJKA
BY
ATTORNEYS

United States Patent Office 3,098,643
Patented July 23, 1963

3,098,643
SHOCK AND VIBRATION ISOLATOR
Albert A. Ondrejka, Delta Ave., Rome, N.Y.
Filed Mar. 15, 1962, Ser. No. 180,059
15 Claims. (Cl. 267—1)
(Granted under Title 35, U.S. Code (1952), sec. 266)

The invention described herein may be manufactured and used by or for the United States Government for governmental purposes without payment to me of any royalty thereon.

This invention relates generally to shock and vibration isolators, and more particularly to a modular arrangement of stacked, highly elastic elements which may be combined in various ways to provide protection for equipment or structures subject to the effects of shock and vibration.

The solution of shock and vibration problems heretofore has involved the designing of separate mounts for various weights of structures and directions of forces. The prior art devices generally used the compression of a resilient material to provide the necessary isolation. Additionally, these devices sometimes required the addition of fluid to aid in the damping effect.

In order to provide the isolation from shock or vibration, the isolator is required to store energy and release it in a different time relation and also to dissipate the energy in the form of heat. Thus, motion and force are isolated to reduce stresses and deflections of members to be mounted. The instant invention lends itself to the changing of the natural frequency or deflection rate and the energy capacity of the isolators.

Accordingly, it is an object of my invention to provide an isolator module which is capable of stacking in order to provide different degrees of shock and vibration.

It is another object of this invention to provide isolator banks which allow for economy and simplicity of design with low fabrication costs.

It is still another object of this invention to provide a series of elastic discs which are cantilevered and meshed to produce the effect of a compact and efficient spring suspension.

It is a further object of this invention to provide a meshed disc shock and vibration isolator which utilizes sliding friction for damping.

It is a still further object of this invention to provide a modular arrangement of isolators which enables the designer to change easily the various parameters in a bank of isolators in order to accommodate various shock and vibration conditions. Thus, immediate testing of the effectiveness of an arrangement is available to the designer.

It is a still further object of this invention to provide a stacked disc isolator wherein the clearances between the equipment and its support may be easily modified.

Another object of this invention involves the provision of an isolator bank system which eliminates the need for storing large numbers of isolators thereby simplifying the problem of logistics.

Still another object of this invention is to provide an isolator which may be easily repaired as opposed to shear or compression type isolators.

Still another object of this invention is to provide a modular isolator which may easily be manufactured of various materials, including those resistant to high temperature and those which would not be affected by creep or aging due to humidity, temperature changes, ultraviolet light or ozone.

A further object of this invention is to provide isolator banks which are of lighter weight than conventional rubber mounts.

A still further object of this invention is to provide an isolator arrangement which may have metal in its construction in order to provide an electrical ground for equipment to be mounted thereon.

These and other advantages, features and objects of the invention will become more apparent from the following description taken in connection with the illustrative embodiments in the accompanying drawings, wherein:

Basically, the device of this invention comprises a series of concentric elastic discs or wafers and interleaved spacers in a superposed relation which may be mounted with respect to other duplicate arrangements such that cantilevered elastic elements allow a meshing of separate isolator banks.

In the drawings like elements are designated by the same numerals.

Figure 1:
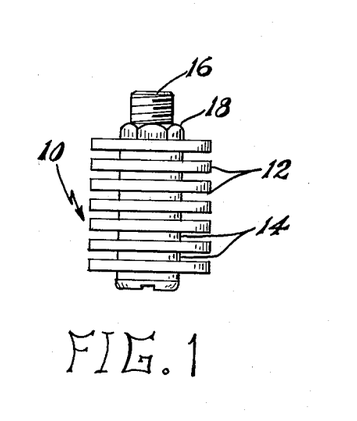
FIGS. 1 and 2 are a side elevation and top view, respectively, of a single isolator.
Figure 2:
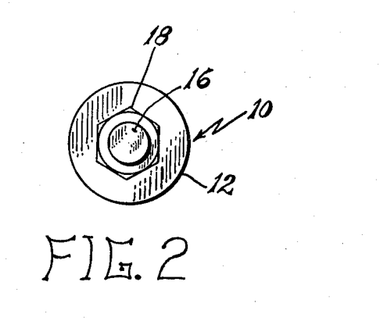

Referring to FIGS. 1 and 2, 10 represents an isolator bank wherein a series of elastic elements in the form of discs or wafers 12, having a hole through their central axis, are mounted on a bolt or stud 16 with spacer elements 14 between adjacent wafers 12. A nut 18 is threaded on bolt or stud 16 in order to lock the assembly together. The materials utilized for the elastic elements 12 may be of almost any standard material having desired properties, e.g., the discs may be of metal to provide an electrical ground and resistance to other environmental factors or of reinforced plastic, laminated plastic, plastic or a combination of these materials. The spacer elements 14 which maintain a fixed distance between adjacent discs 12 in order to allow for a meshing with other isolator banks may be made of metal, plastic, cork, elastomers or a combination of any of the preceding materials. Although FIGS. 1 and 2 show the spacers as single elements, they may comprise stacks in order to provide a desired spacing. The stud or bolt 16, in addition to maintaining the relationship between the wafers 12 and spacers 14, may also be utilized to fasten the equipment to be isolated to a supporting platform, rack or frame. Therefore, elements 16 may have a variety of shapes of its head and may also be provided with threaded portions at both ends in order to allow for a variation in design for different loading capacities, natural frequencies, energy absorbtion, and deflections of an isolator bank by allowing for a variation in the number of elastic elements 12 to be meshed.

Figure 3:
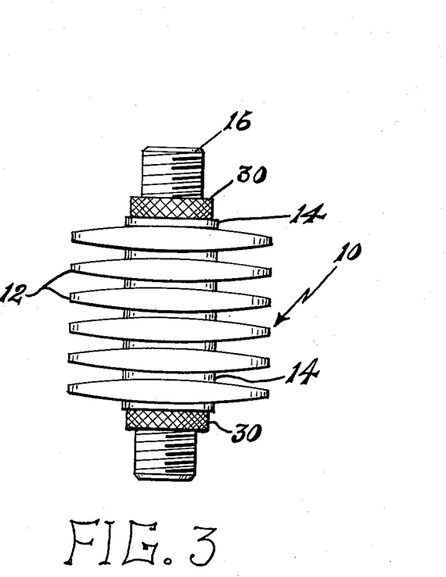
FIGS. 3 and 4 are a side elevation and top view, respectively, of a modification of the isolator of FIG. 1 illustrating a different shape for the discs.
Figure 4:
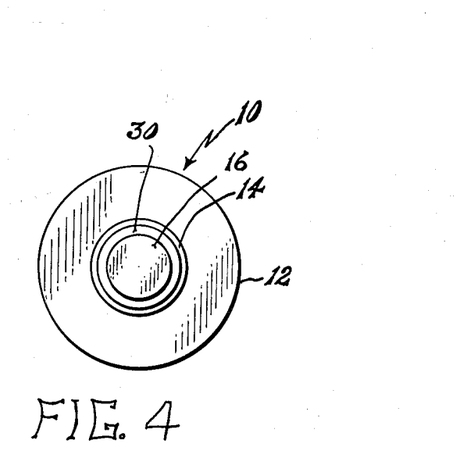

FIGS. 3 and 4 exemplify a variation of FIGS. 1 and 2 wherein the disc or wafer elements 12 are tapered to provide different shock and vibration isolation and absorption characteristics than the constant thickness elements depicted in FIG. 1. The spacers in this embodiment are of constant thickness while the studs 16, of the type having threads extending from both ends and which is providing with knurled nuts 30 for aligning the assembly.

Figure 5:
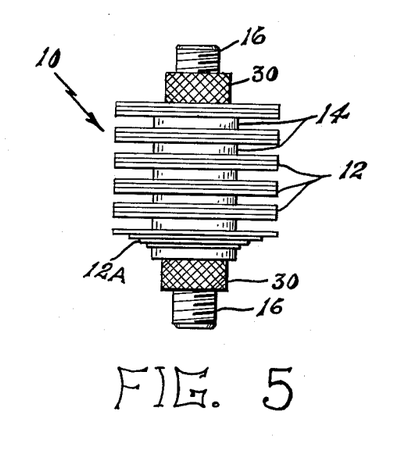
FIGS. 5 and 6 are a side elevation and top view, respectively, of an isolator having laminated discs.
Figure 6:
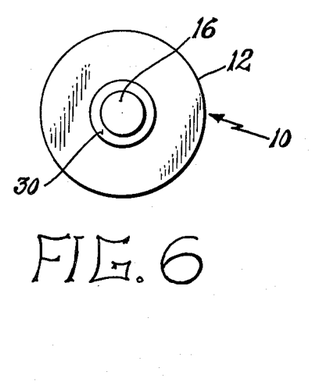

FIGS. 5 and 6 are similar to the embodiment of FIGS. 3 and 4; however, the elastic elements 12 in this embodiment are a laminated plastic which may be provided with a coating of a film of plastic. The bottom-most wafer 12A represents a variation illustrating laminated stack wafer with varying diameters. Although the device is shown with solid spacers 14, these could be laminated in the same manner depicted relative to elements 12. Also, all of the elements 12 could have the varying diameter shown as 12A.

Figure 7:
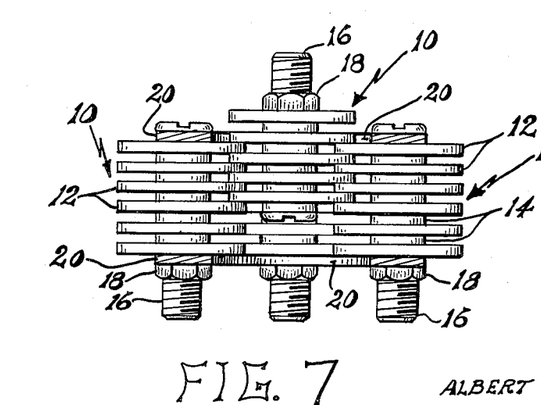
FIGS. 7 and 8 are a side elevation and top view, respectively, of three banks of discs interleaved with a large central bank.
Figure 8:
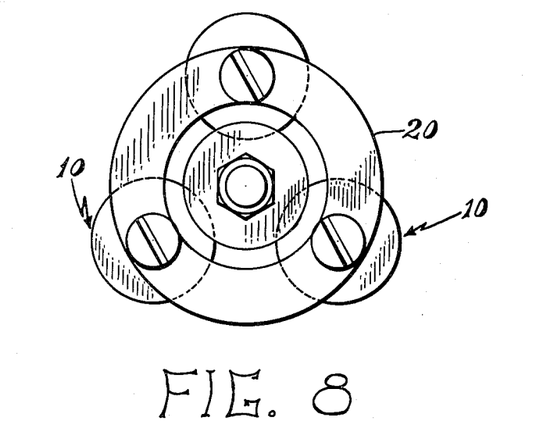

The combination of isolator banks shown in FIGS. 7 and 8 have three isolator banks 10 arranged 120° apart to provide a support for a fourth isolator 10 wherein the elastic elements 12 of each of the 120° spaced isolators are interleaved with at least some of those of the central, fourth isolator. Equipment being isolated, for example, for shipment, may be fastened to the bolt 16 of the center isolator while the bolts from the remaining isolators would be secured to a support, platform, or frame. The spacing of the 120° spaced isolators is maintained by means of at least one disc or keeper ring 20. Keeper 20 need not be of circular shape and need only be of a shape to provide its spacing function, i.e., it may be triangular in the instant embodiment. Variation in the characteristic of this device may be obtained not only by a variation in the materials but also in the number of elements in engagement and the amount of their engagement with the central isolator.

Figures 9, 11:
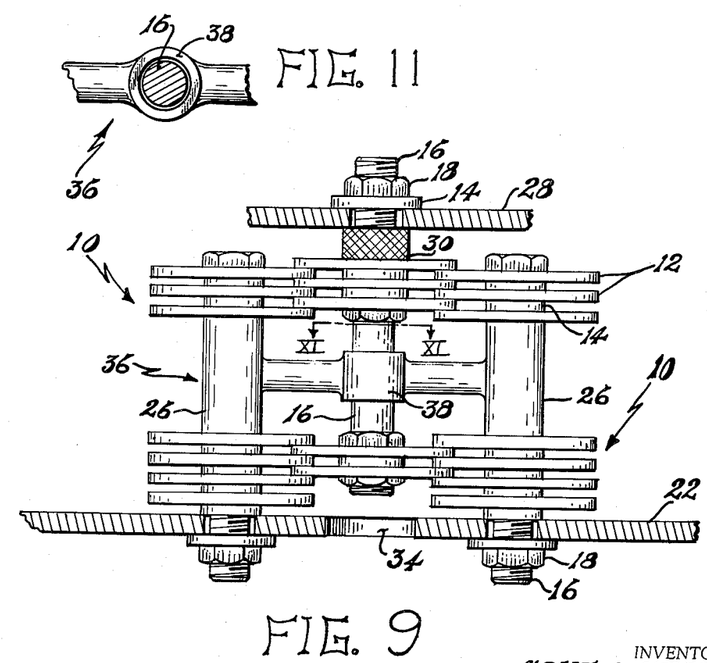
FIGS. 9, 10 and 11 are a side elevation, top view and sectional view along lines XI—XI of FIG. 9, respectively, of an arrangement of three banks of discs having a frame for aligning the separate banks.
Figure 10:
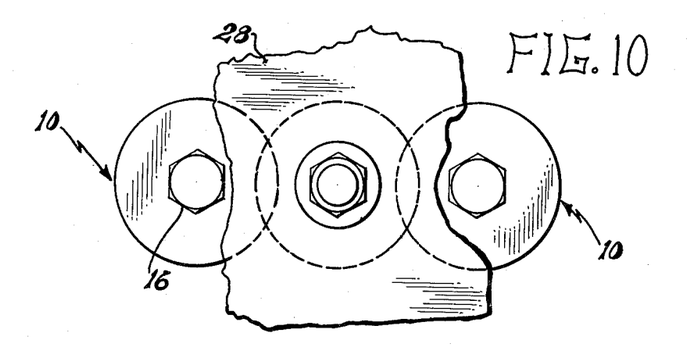

An arrangement shown in FIGS. 9 through 11 provides for isolation where the spacing would have to be in a long, narrow confine. The banks 10 in this embodiment are located in a straight line and may be increased indefinitely along this same line. The arc of intercept or mesh of this embodiment, when bisected, would be on a straight line through the centers of the isolator banks. Of course, the amount of banks 10 and elements 12 in the banks which are utilized would depend upon the loading characteristics and the isolation frequency to be protected against. The central isolator bank 10 is allowed to move only in a vertical direction. The load is represented by numeral 28 and is attached to the central isolator by means of a nut 18 and spacer washer 14. The opposite end of the isolator is represented by a frame 22 to which the outer isolator banks 10 are secured in the same manner. A hole 34 is provided in the frame 22 directly under the center stud to prevent bottoming of the stud with excessive shock loads. A spacer 36 of H-shape has a bearing 38 through the central portion, as shown, in order to allow movement of stud 16 therethrough while the outer arms 26 of the H-shaped member provide for the spacing between the upper and lower sections of meshed discs 12. This embodiment is suitable for use in the corners of racks; however, where a side movement is to be protected against, isolators located in the direction of the force against which the equipment is to be protected must be provided.

Figure 12:
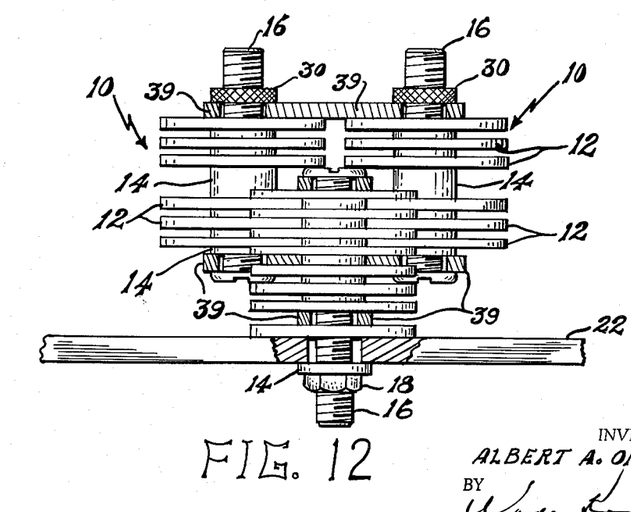
FIGS. 12 and 13 are a side elevation and top view, respectively, of a cruciform arrangement of four isolation banks held together by keeper strips.
Figure 13:
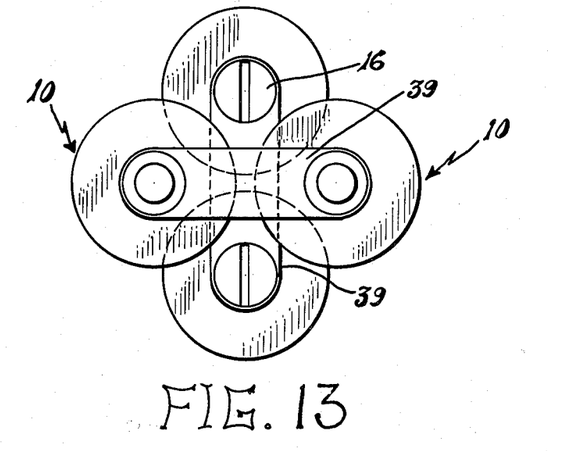

FIGS. 12 and 13 show a cruciform arrangement of four isolation banks which are held together by means of keeper strips. This arrangement provides two anchoring or fastening points for equipment and two for a support frame indicated by numeral 22. The keeper strips 39 are fastened to the bolts or studs 16 of the isolator banks in order to aid in the maintenance of the cruciform shape. In addition, the keeper strips serve to keep the individual isolators in mesh in the event that side forces are present. The top-most bolts 16 (FIG. 12) are utilized for fastening to a platform. Extra, unused spacer and elastic elements are shown in this embodiment which need not be removed if this arrangement is to be the module upon which the designer will build.

Figure 14:
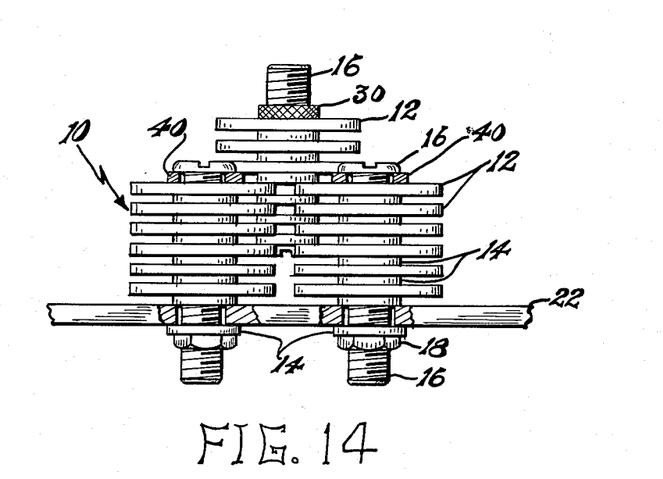
FIGS. 14 and 15 are a side elevation partly in section and a top view, respectively, of four banks of isolators which support a fifth, center isolator capable of supporting very heavy loads.
Figure 15:
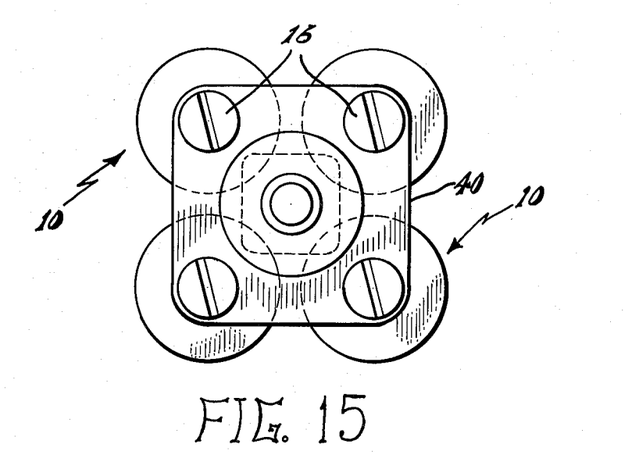

FIGS. 14 and 15 show four banks of isolators which support a fifth or center isolator capable of supporting very heavy loads. A keeper ring 40 is utilized in this embodiment to maintain the four outer banks in meshed alignment with a centrally supported bank such that they form a generally square shaped unit. The keeper ring also aids in supporting the unit against side sway. In this embodiment the larger spacers 14 may be made up of a number of smaller units.

Figure 16:
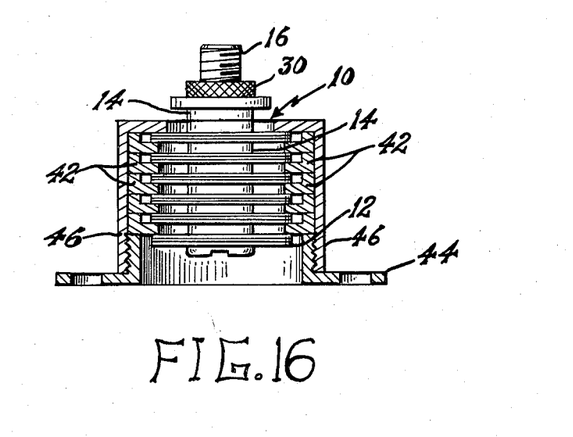
FIGS. 16 and 17 are a side elevation partly in section and a top view, respectively, showing an isolator bank in a cylindrical base wherein the discs of the isolator are interleaved with retaining rings in the base.
Figure 17:
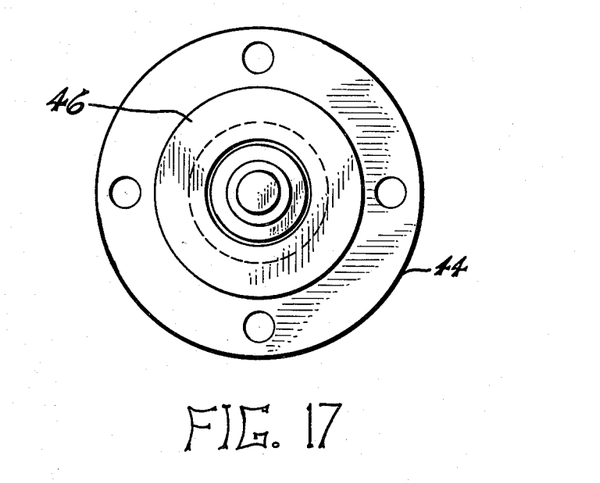

The embodiment shown in FIGS. 16 and 17 allow for the utilization of a cylindrical base 44 which provides a lightweight unit capable of supporting either light or heavy loads depending upon the arrangement of the elastic disc elements 12. The elastic disc elements 12 are meshed with retaining rings 42 of L-shaped cross-section. These L-shaped retaining rings also serve as spacers for each other. The isolator bank in this case would be attached to a load while an externally threaded flange 46 is arranged for engagement with an external thread on the base 44 in order to provide a locking means for the retaining rings and also to provide a mounting for the unit to a platform.

Figure 18:
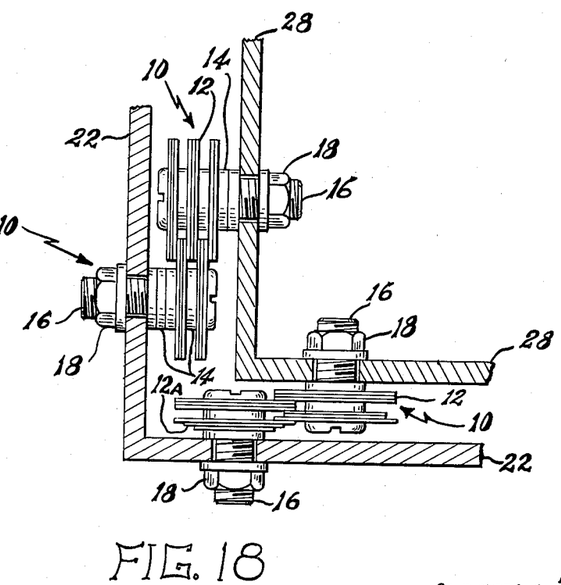
FIG. 18 is a view in elevation, partly in section, which depicts an arrangement of banks of discs capable of providing isolation from vibration or shocks emanating either from lateral or vertical directions.
Figure 19:
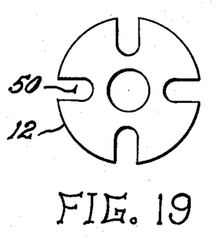
FIGS. 19 through 26 show four alternative forms of discs capable of use in the isolators of this invention, FIGS. 19, 21, 23 and 25 comprise top views, respectively, of FIGS. 20, 22, 24 and 26.
Figure 20:
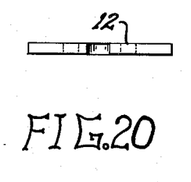
Figure 21:
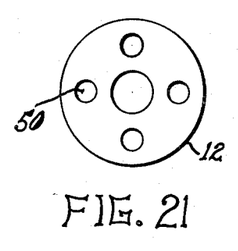
Figure 22:
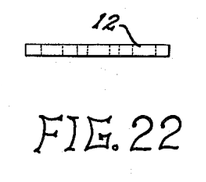
Figure 23:
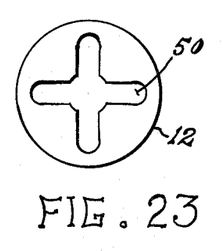
Figure 24:
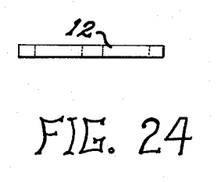

Most of the isolators heretofore described have provided their maximum isolation from shock and vibration against movement in a single direction. The embodiment of FIG. 18 shows an arrangement whereby isolator banks may be utilized in a corner in order to provide multidirectional protection against shock and vibration. The device basically comprises two pairs of isolator banks 10 with the axes of each pair perpendicular to the axes of the other. The supporting frame 22, in this case a corner piece, is secured to one isolator bank of each pair while the lower platform 28 is secured to the upper isolators of each pair.

Figure 25:
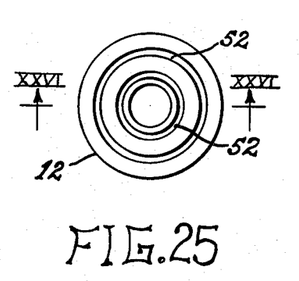
Figure 26:
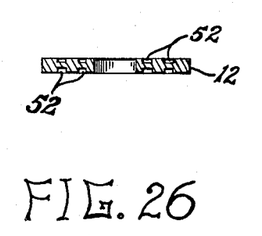

In order to provide for a different stiffness of elements 12 the embodiments of these elements shown in FIGS. 19, 21, 23 and 25 and their respective top views are provided. The stiffness is affected by the location and type of perforations or slots 50 in order to change the natural frequencies of the discs and, therefore, change the characteristics of the isolators in which they are used. FIGS. 25 and 26, rather than having slots and holes therethrough in order to change the characteristics of the discs, are provided with grooves 52 in the top and bottom surfaces of the discs.

Thus, from the designs presented in the figures, it may be seen that when a disturbing force or motion is applied to the bolt or stud which holds an isolator bank to the equipment to be protected, the equipment will move only in the direction of the applied motion. This movement is permissible since the resilient elements 12 are meshed with adjacent banks or the retaining rings of FIG. 16. The discs are basically cantilevered beams that deflect and slide on each other, and, in addition have a slight circular motion due to friction. The amount of the deflection and sliding distance is dependent on the force supplied, the spring constant of the disc, the number of discs in mesh, the spacing of the discs, the friction coefficient between adjacent disc elements and the placement of the isolator banks. In addition, the natural frequency of an isolator bank may be changed by varying the geometric pattern of the isolator banks by changing the amount of discs in mesh or by changing the shape and characteristics of the discs.

Accordingly, a designer may utilize various configurations and arrangements of the banks to best serve a particular design condition. It should be noted that the friction of the sliding discs creates a damping condition known as friction damping in limiting resonant vibrations; however, solid damping is also available to the designer, for example, by utilizing rubber for the spacers in the banks in order to take advantage of the internal friction in the spacers.

Although this invention has been described with reference to particular embodiments, it will be understood to those skilled in the art that the invention is capable of a variety of alternative embodiments within the spirit and scope of the appended claims.

I claim:

1. A shock and vibration isolator unit comprising at least a pair of shafts, wafer elements on each of said shafts, spacer elements on said shafts between consecutive wafer elements, the radial extension of said spacer elements from said shafts being less than that of said wafer elements, and means for securing said spacer elements and said wafer elements on said shafts, said shafts being oriented in the same direction and having the wafer elements of each shaft in mesh with the wafer elements of at least one other shaft.

2. The unit defined in claim 1 wherein said wafer elements are of resilient material.

3. The unit defined in claim 1 wherein said spacer elements are of resilient material.

4. The unit defined in claim 1 wherein said spacer elements are of rigid material.

5. The unit defined in claim 1 wherein the wafer elements are of a resilient elastomer and the spacer elements comprise metal discs.

6. The unit defined in claim 1 wherein said wafer elements are of resilient, reinforced plastic and said spacer elements are of rigid metal.

7. The unit defined in claim 1 wherein said spacer elements are of cork.

8. The unit defined in claim 1 wherein said spacer elements are of steel.

9. The unit defined in claim 1 wherein said spacer elements are of rubber.

10. The unit defined in claim 1 wherein said wafer elements are of resilient plastic.

11. The unit defined in claim 1 wherein said wafer elements are rubber.

12. The unit defined in claim 1 wherein said wafer elements are of laminated plastic.

13. A shock and vibration isolator comprising at least two generally parallel shafts, and a series of alternately disposed discs and spacer elements fixedly positioned on said shafts, said disc elements being of resilient material and at least some of the disc elements of each shaft being in mesh with those of at least one other shaft.

14. An isolator as defined in claim 13 including means for maintaining said shafts in a fixed relationship to each other in directions other than along the axes of said shafts.

15. An isolator capable of absorbing shock and vibration from a number of directions, said isolator comprising at least one pair of shafts oriented in each direction from which a force to be protected against is expected, each of said shafts having alternate disc and spacer elements mounted thereon, and the discs on each shaft being in mesh with the discs of at least one other shaft oriented in the same direction.

References Cited in the file of this patent

UNITED STATES PATENTS

| 7,706 | Ray | Oct. 8, 1850 |
| 2,184,482 | Austin et al. | Dec. 26, 1939 |
| 2,424,635 | Schwall | July 29, 1947 |

FOREIGN PATENTS

| 539,327 | France | Mar. 31, 1922 |
| 24,202 | Australia | of 1929 |